3,261,822
PROCESS OF PREPARING HEAT GELABLE SOYBEAN PROTEIN
Frederick M. Robbins, Congers, Anthony G. Bonagura, West Nyack, and Robert S. Yare, New City, N.Y., assignors to General Foods Corporation, White Plains, N.Y., a corporation of Delaware
No Drawing. Filed Jan. 29, 1962, Ser. No. 169,608
6 Claims. (Cl. 260—123.5)

The present application is a continuation-in-part of patent application Serial No. 147,090, filed October 23, 1961, now abandoned.

The present invention relates to a process for preparing a soybean protein having improved heat gelable properties and the ability to form protein fibers.

Soybean protein because of its low cost and high nutritional value has been found to be a desirable substitute for many other food proteins. However, despite the fact that heat gelable soybean protein has been found to be suitable as a substitute for other proteins, its use has been extremely limited heretofore. The reason for such limited use has been that such prior art soybean proteins have not been substantially color free and bland and have not produced very satisfactory gels when employed at low use concentrations. The gels obtained through the use of prior art heat gelable proteins are in essence extremely viscous materials which, while quite often being self-sustaining, do not form a "gel" material typified by gelatin gels.

The prior art has also employed soybean proteins to produce fibers. However, in such fiber formation techniques, it has always been necessary to solubilize the protein at alkaline pHs greater than pH 11. Such rigorous treatment of the protein results in a partial degradation of the soybean protein with a resulting loss of many of the desirable properties of the protein with respect to both physical characteristics and nutritional properties. It would therefore be desirable to produce a soybean protein which can be formed into fibers without having first been subjected to such extremely rigorous treatment.

It is an object of the present invention to prepare a soybean protein product which is bland, heat gelable and has superior gelling characteristics. It is yet a further object of the present invention to prepare a soybean protein product which is capable of being formed into fibers without first being subjected to extremely rigorous solubilization conditions. Further objects of the present invention will be apparent from a reading of the specification.

It has now been discovered that the objects of the present invention may be obtained by maintaining a slurry of soybean meal and water at a pH of 3.5 to 5.5 for a period of time sufficient to solubilize the soluble proteins and carbohydrates. The soluble fraction including proteins and carbohydrates is separated from the insoluble fraction in the slurry. The insoluble fraction is dispersed in water to form a slurry which is adjusted to a pH of 6 to 11 to solubilize the desired soybean protein. The solubilized soybean protein is separated from the insolubles in the slurry, is precipitated by adjusting the pH to the isoelectric point of the protein and is separated from the supernatant liquid.

The term "soybean meal" as used in this invention refers to those soybean meals which have been defatted under mild temperature conditions. Typical of such meals are solvent extracted meal which has been subjected to low temperature solvent stripping or pressed soybean meals which have not been subjected to high temperatures in removal of the soybean oil.

The term "isoelectric point" as used in this invention refers to the mean isoelectric point of the soybean protein being isolated.

A bland, heat gelable soybean protein may be prepared by mixing soybean meal with water at a pH of 3.5 to 5.5, preferably 4 to 5, and most preferably at a pH of about 4.5. The amount of water employed may be in the order of 2 to 100 parts by weight per part by weight of soybean meal, more preferably 2 to 10 parts by weight per part by weight of a soybean meal, and most preferably 7 parts by weight per part by weight of soybean meal. While it is possible to adjust the pH of the soybean slurry after the soybean meal has been added to the water, it is preferred to adjust the pH of the water prior to addition of the soybean meal, and maintain the pH of the slurry at the desired pH as the soybean meal is being added. While the temperatures employed may be below those temperatures at which denaturation of the protein will take place, it is preferred to employ a temperature below 40° C. and most preferably a temperature in the order of 25° C. The slurry is maintained at the desired pH and temperature for a period of time sufficient to solubilize all of the soluble material which primarily consists of soluble proteins (albumins and albuminoids), soluble carbohydrates and soluble salts. Ordinarily a period of time of less than thirty minutes will suffice to solubilize all of those constituents which are soluble. While a period of time in excess of thirty minutes may be employed, it has been found that the desired results are obtained in less than thirty minutes and for economic reasons an extended period of time is not desirable.

The soluble fraction obtained is separated from the insoluble fraction in as short a time as conveniently possible by any ordinary separation means, typically filtration or centrifugation. The undesirable soluble fraction is discarded and the insoluble fraction containing the insoluble protein, cellulosic constituents and insoluble salts is suspended in water at a ratio of 2 to 100 parts by weight per part by weight of soybean meal, more preferably 2 to 10 parts by weight per part by weight of soybean meal, and most preferably 7 parts by weight per part by weight of soybean meal to form a slurry. The pH of the slurry is adjusted to 6 to 8, and preferably to 6.5 to solubilize the desired soybean protein. The time required to solubilize the soybean protein will generally be less than 30 minutes.

The solubilization of the protein as carried out permits a separation of the protein from the remaining insoluble constituents. The soluble protein fraction is removed from such insoluble constituents by ordinary separation means. In carrying out the present invention, it is preferred that the solubilized protein fraction not contain suspended matter. It has been found that suspended matter affects the clarity of the final protein product particularly when gels are formed. When it is preferred to obtain a clear protein gel, all suspended matter should be removed from the soluble protein fraction.

The pH of the soluble protein fraction is reduced to the isoelectric point of the protein which is in the order of 4.5. The pH is reduced by addition of acid with agitation at a rate sufficiently slow to avoid localized concentration of acid which would possibly denature the protein in such localized areas. Adjustment of the pH to about 4.5 causes a precipitation of the protein and the precipitated protein may be separated from the supernatant by any ordinary separation means. If desired, the protein obtained may be washed to remove any excess acid, although it is not essential to do so. Where washing is carried out, it is preferred to employ 2 to 100 parts by weight of water to one part by weight of soybean cake, preferably 2 to 10 parts by weight of water to one part by weight of soybean cake and more preferably 7 parts by weight of water to one part by weight of soybean cake.

The term "solubilized" as used in this invention refers to the standard dispersion of protein wherein the protein exists in what is considered to be a solubilized condition, a colloidal suspension, or a dispersion, all of these terms being well known to those skilled-in-the-art and all having equal meaning.

While the soybean cake obtained after acid precipitation may be employed in the wet state, if desired, the product can be dried under temperature conditions which do not denature the protein. Typical of the drying techniques which may be employed would be freeze drying, vacuum drum drying, or low temperature spray drying.

The product obtained in the wet form is a bland, edible, white cake, and in the dry form is a bland, edible, dry white powder which is free of the undesirable bitter and beany flavor usually found in prior art soybean proteins. When suspended in water at room temperature (25° C.) and in a concentration of 14% protein, the product, as the pH is adjusted upwardly to 6.5 becomes more viscous and at 6.5 has the physical appearance of prior art heat gelable soybean proteins which have been heated to about 90° C. The protein of the present invention at pH 6.5 and in a concentration of 14% when heated at 100° C. forms a gel which is far stronger than any prior art soybean protein gel heretofore known and is a continuous, elastic, optically clear, bland gel which cleaves with a smooth face. The gel has a Bloom strength of about 202 as measured by standard gelatin Bloom techniques when the gel is prepared at pH 6.5 and the protein, prior to heat gelation, has a viscosity of about 34,153 centipoises as measured by a Brookfield Viscometer with a heliopath spindle of 2.8 cm. diameter rotated at 12 r.p.m.

A further advantage of the protein of the present invention is that it can be formed into fibers by spinning at a pH of 6.5 into an acid coagulating bath. Such characteristics permit the use of the protein without first treating the protein at a high alkaline pH as has been required heretofore in the prior art. The prior art in general has maintained the protein at a pH of 11.0 or above in order to have the protein in the proper physical form for spinning.

The protein products of the present invention due to their heat irreversible characteristics when heated at 90° C. or higher and their ability to substantially duplicate gelatin gels in physical appearance may serve as substitutes in many cases for gelatin where it has been desired to have a gelatin-like product which is heat irreversible. Such uses may include the jelly coating on canned meats, films and the like.

A further advantage of the protein of the present invention is that heat reversible gels may be formed if the soybean protein of the present invention is dispersed in water to form a concentration of greater than about 10% protein and the pH of the protein dispersion is adjusted to between 6.5 to 7.5. At concentrations of at least about 13% soybean protein, a self-sustaining gel forms. The gel does not cleave with a smooth face and is similar in strength to cornstarch gels. When the protein, in either solution or gel form, is heated to about 65°–85° C. and then cooled, a self-sustaining gel is formed which is similar in appearance and strength to a weak gelatin gel. The strength of the gel obtained will vary depending on the temperature to which the initial gel is heated, the higher the temperature, the stronger the gel. The gel which forms when the protein gel is heated and cooled, melts upon re-heating to between about 80° to 85° C. and re-forms upon cooling. When the gel is heated to 85° C., the gel must be cooled immediately after reaching 85° C. If the reversible gel is desired, for even short exposure at 85° C. will cause formation of the heat irreversible gel. At the higher temperatures a shorter exposure of the protein to the temperature employed is required. Preferably, the heated mixture is cooled to about 25° C. While specific times can be found with respect to the duration of heating of the gels at 65° to 85° C., it appears that an endothermic reaction is required to obtain the heat reversible gels and that the temperatures to which the protein at a given pH and concentration is heated and the time interval the protein is held at the particular temperature are in an inverse relationship to each other, the higher the temperature employed, the shorter the time required. Table I sets forth typical time-temperature relationships of the protein at concentrations of 10% and 12% and pH's of 6.5, 7.0, 7.5.

TABLE I

| pH | Protein Concentration (Percent) | Temperature (° C.) | Time (Minutes) |
|---|---|---|---|
| 6.5 | 10 | 70 | 13–19 |
| 6.5 | 10 | 80 | 2–4 |
| 6.5 | 12 | 70 | 2–4 |
| 6.5 | 12 | 80 | 0–1 |
| 7.0 | 10 | 70 | 9–15 |
| 7.0 | 10 | 80 | 2–9 |
| 7.0 | 12 | 70 | 3–5 |
| 7.0 | 12 | 80 | 0–2 |
| 7.5 | 10 | 70 | 8–18 |
| 7.5 | 10 | 80 | 1–7 |
| 7.5 | 12 | 70 | 4–8 |
| 7.5 | 12 | 80 | 0–2 |

The following examples set forth a number of embodiments of the present invention:

*Example 1*

Three hundred fifty grams of low temperature, solvent extracted, defatted soybean meal was added to 2.5 liters of water which had been adjusted to pH 4.5 (preextraction pH) by the addition of normal hydrochloric acid. As the soybean meal was added with agitation, the pH was maintained at 4.5. The resulting slurry was held at a pH of 4.5 for 35 minutes under constant agitation.

The slurry was centrifuged for 10 minutes at 700 RCF×G (relative centrifugal force times gravity). The supernatant at the end of centrifugation was discarded and 1,725 ml. of water was added to the centrifuged cake. The material was stirred to form a slurry and the pH was then adjusted to pH 6.4 (solubilization pH) by the addition of sufficient normal sodium hydroxide. The slurry was maintained at 25° C. for 30 minutes under constant agitation. The pH throughout was maintained at 6.4. At the end of the 30 minute period of time, the slurry was centrifuged for 45 minutes at 10,000 RCF×G. The cake was discarded and the supernatant was adjusted to pH 4.5 to precipitate the protein by the addition of normal hydrochloric acid which was slowly added with agitation in order to avoid localized action. The precipitated protein and supernatant was centrifuged for 10 minutes at 700 RCF×G and the supernatant was then discarded. The protein cake obtained was a white, pasty mass which contained 25 percent protein (as measured by standard Biuret technique as described on page 545 of the 33rd edition of Analytical Chemistry, 1961) and 75 percent water. The cake was diluted to provide a protein concentration of about 14%. The cake formed an optically clear, amber colored, elastic, continuous gel which cleaved cleanly when the pH was adjusted to 6.5 and the material heated at 100° C. The yield of protein obtained by the above technique was 45% of the protein in the meal.

*Example 2*

Additional experiments were carried out employing the procedure set forth in Example 1 except that the pre-extraction pH and solubilization pH employed were different than those employed in Example 1. The following table sets forth the various pre-extraction and solubilization pHs employed and the protein yield obtained under the various conditions based upon the protein in the meal:

| Pre-extraction pH | Solubilization pH | Percent Yield |
|---|---|---|
| 3.5 | 6.5 | 19 |
| 4.0 | 6.5 | 52 |
| 4.0 | 7.0 | 57 |
| 4.5 | 6.0 | 22 |
| 4.5 | 6.5 | 45 |
| 4.5 | 7.0 | 57 |
| 4.5 | 11.0 | 84 |
| 5.0 | 6.0 | 23 |
| 5.0 | 6.5 | 34 |
| 5.0 | 7.0 | 58 |
| 5.5 | 6.5 | 41 |

*Example 3*

Ten grams of the soybean protein obtained in Example 1 were dispersed in 90 ml. of water and the pH of the dispersion adjusted to pH 6.5. The protein dispersion had a viscosity of 3,700 centipoises at 24° C. and at pH 6.5. The dispersion was then heated to 70° C. in 2 minutes and maintained at 70° C. for 7 minutes. When cooled to 23° C. a gel formed and had a viscosity of 48,000 centipoises. Upon reheating to 80° C., it was observed that the viscosity decreased to 16,000 centipoises.

Although the present invention has been described in part by means of specific examples, reference should be had to the appended claims for a definition of the scope of the invention.

What is claimed is:

1. A process for preparing a bland, optically clear, heat gelable soybean protein which comprises
    adding one part by weight of soybean meal to 2 to 100 parts by weight of water, having a pH of 3.5 to 5.5, to form a first slurry,
    maintaining the pH of said first slurry at 3.5 to 5.5 during said addition,
    maintaining the temperature of said first slurry below about 40° C. to obtain a soluble fraction containing soluble protein, soluble carbohydrates and soluble salts and an insoluble fraction containing insoluble protein, cellulosic constituents and insoluble salts,
    separating said soluble fraction from said insoluble fraction,
    suspending said insoluble fraction in water to form a second slurry,
    adjusting the pH of said second slurry to 6 to 8 to solubilize the protein insoluble in said first slurry,
    separating said second slurry into a soluble fraction containing said solubilized protein and an insoluble fraction containing cellulosic materials and insoluble salts,
    adjusting the pH of said soluble fraction of said second slurry to the isoelectric point of said solubilized protein with acid while avoiding local concentration of acid, thereby precipitating said solubilized protein, and
    separating said precipitated protein.

2. A process for preparing a bland, optically clear, heat gelable soybean protein which comprises
    adding one part by weight of soybean meal to 2 to 100 parts by weight of water while maintaining the pH at about 4.5 to form a first slurry,
    maintaining the temperature of said first slurry at one in the order of 25° C. to obtain a soluble fraction containing soluble protein, soluble carbohydrates and soluble salts and an insoluble fraction containing insoluble protein, cellulosic constituents and insoluble salts,
    separating said soluble fraction from said insoluble fraction,
    suspending said insoluble fraction in water to form a second slurry,
    adjusting the pH of said second slurry to about 6.5 to solubilize the protein insoluble in said first slurry,
    separating said second slurry into a soluble fraction containing said solubilized protein and an insoluble fraction containing cellulosic materials and insoluble salts,
    adjusting the pH of said soluble fraction of said second slurry with acid to about pH 4.5 thereby precipitating said solubilized protein,
    agitating during acid precipitation at a rate sufficient to avoid local concentration of acid, and
    separating said precipitated protein thus obtained.

3. A process for preparing a bland, optically clear, heat gelable soybean protein which comprises
    adding about one part by weight of soybean meal to about 7 parts by weight of water while maintaining the pH at about 4.5 to form a first slurry,
    maintaining the temperature of said first slurry at one in the order of about 25° C. to obtain a soluble fraction containing soluble protein, soluble carbohydrates and soluble salts and an insoluble fraction containing insoluble protein, cellulosic constituents and insoluble salts,
    separating said soluble fraction from said insoluble fraction,
    suspending said insoluble fraction in water to form a second slurry,
    adjusting the pH of said second slurry to about 6.5 to solubilize the protein insoluble in said first slurry at pH 4.5,
    separating the second slurry into a soluble fraction containing said solubilized protein and an insoluble fraction containing cellulosic materials and insoluble salts,
    adjusting the pH of said soluble fraction of said second slurry with acid to about pH 4.5 thereby precipitating said solubilized protein,
    agitating during acid precipitation at a rate sufficient to avoid local concentration of acid, and
    separating said precipitated protein thus obtained.

4. A process according to claim 3 wherein said precipitated protein obtained is washed with 2 to 100 parts by weight of water per part by weight of protein precipitate and the wash water thereafter separated from the protein precipitate.

5. The product of the process of claim 1 which is capable of forming heat irreversible gelatin type gels, said gels being optically clear, continuous, elastic and cleaving with a smooth face.

6. The product of the process of claim 1 having a Bloom strength of about 202 at a 14% concentration at pH 6.5 after being heated at 100° C., said protein prior to heat gelation having a viscosity of about 34,153 centipoises.

References Cited by the Examiner

UNITED STATES PATENTS

| 2,260,640 | 10/1941 | Rawling et al. | 260—123.5 |
| 2,415,426 | 2/1947 | Henning | 260—123.5 |
| 2,732,395 | 1/1956 | Bolley et al. | 260—123.5 XR |

WILLIAM H. SHORT, *Primary Examiner.*

LEON ZITVER, *Examiner.*

D. P. CLARKE, *Assistant Examiner.*